United States Patent [19]
Willis et al.

[11] Patent Number: 5,922,207
[45] Date of Patent: Jul. 13, 1999

[54] FILTER AID FOR CLAY PROCESSING

[75] Inventors: Mitchell J. Willis, Macon, Ga.; Sanjay Behl, Fontainebleau, France; Raymond H. Young, Macon, Ga.

[73] Assignee: Engelhard Corporation, Iselin, N.J.

[21] Appl. No.: 09/070,681

[22] Filed: Apr. 30, 1998

Related U.S. Application Data

[63] Continuation-in-part of application No. 08/857,650, May 16, 1997., abandoned

[51] Int. Cl.$^6$ ..................................................... B01D 37/03
[52] U.S. Cl. .............................. 210/710; 209/5; 210/725; 210/727; 210/733; 210/734; 210/778; 501/148
[58] Field of Search ................................ 209/5; 210/710, 210/725, 727, 728, 733, 734, 778; 501/148

[56] References Cited

U.S. PATENT DOCUMENTS

| | | | |
|---|---|---|---|
| 3,371,988 | 3/1968 | Maynard et al. | 23/110 |
| 3,701,417 | 10/1972 | Mercade | 209/5 |
| 3,837,482 | 9/1974 | Sheridan, III | 209/5 |
| 3,862,027 | 1/1975 | Mercade | 209/5 |
| 4,334,985 | 6/1982 | Turner, Jr. | 209/5 |
| 4,468,317 | 8/1984 | Turner, Jr. | 209/5 |
| 4,604,369 | 8/1986 | Shi | 501/148 |
| 4,647,382 | 3/1987 | Sharpe, Jr. | 210/710 |
| 4,738,726 | 4/1988 | Pratt et al. | 106/308 N |
| 4,741,838 | 5/1988 | Sharpe, Jr. | 210/710 |
| 4,816,166 | 3/1989 | Cawiezel | 210/727 |
| 4,990,262 | 2/1991 | Sharpe, Jr. | 210/710 |
| 4,990,263 | 2/1991 | Sharpe, Jr. | 210/710 |
| 5,535,890 | 7/1996 | Behl et al. | 209/5 |

FOREIGN PATENT DOCUMENTS

| | | | |
|---|---|---|---|
| 3267 | 2/1990 | European Pat. Off. . | |

*Primary Examiner*—Peter A. Hruskoci

[57] ABSTRACT

A process for filtering kaolin clay slurries in the presence of a filter aid which increases the percent solids in the filter cake, decreases the product solids in the waste filtrate, increases the rate of filtration, and yet does not interfere with redispersal of the filter cake after filtration. The process utilizes high molecular weight, highly anionic polyacrylic acid homopolymers or copolymers, or water soluble salts thereof, as filter aids for thickening and dewatering kaolin clay slurries. The flocculated clay may be redispersed after the separation process by normal means, such as the addition of low molecular weight anionic polymers with mixing.

6 Claims, No Drawings

FILTER AID FOR CLAY PROCESSING

This application is a continuation-in-part of U.S. Ser. No. 08/857,650 filed May 16, 1997, now abandoned.

FIELD OF THE INVENTION

This invention relates to filter aids useful in filtration processes for separating mixtures of finely divided minerals into constituents thereof, and in particular, to the use of high molecular weight polyacrylic acids or salts thereof as filter aids in the separation of kaolin clay slurries. More particularly, the invention relates to such filter aids which act as flocculants under the acid conditions at which filtration is performed, but which become innocuous when present in dispersed clay slurries at pH values near neutral or alkaline.

BACKGROUND OF THE INVENTION

Flocculants are reagents which when added to suspensions of solids cause the solids to aggregate into larger particles which settle more rapidly and efficiently than in an untreated suspension. Polymeric water soluble flocculants may have a nonionic, anionic, cationic, or amphoteric character. The particular type of flocculant to choose in a given application depends primarily on the physical and chemical nature of the suspended solids, as well as the pH of the aqueous slurry.

Kaolinic clays are mined in the southeastern United States and are usually mined by the open pit method. The clay is initially slurried in water at about 30–50% solids, dispersed with various combinations of inorganic and organic dispersants to maintain a low viscosity and processed. Some of the processing may include the removal of magnetic impurities, removal of sand and silt, improvement of the whiteness or brightness, and dewatering (or filtration). Dewatering is commonly accomplished by rotary vacuum filters, although other methods of dewatering such as pre-thickening, centrifugation, and filtration on pressure filters are feasible. The filter cake obtained from a rotary vacuum filter is, in the present state of the art, usually about 50% to 60% solids.

For the dewatering step of clay processing, it has been found useful to add a flocculating agent as a filter aid. Many high molecular weight organic polymers, whether cationic, anionic or nonionic, have been shown to be capable of flocculating kaolin clay in a satisfactory manner, but they have generally not been able to do so without having deleterious effects on the viscosity of final product, high solids dispersions (e.g., near 70% solids) subsequently prepared from the filter cake. In the present state of the art, a portion of the filter cake is typically spray dried and blended back with the remaining filter cake to obtain an aqueous slurry containing about 70% solids or more. Additional dispersants may be added to the 70% solids slurry with mixing as needed to obtain a final Brookfield viscosity of less than 1000 milliPascal-seconds (mPa.s), and preferably less than 500 mPa.s. This low viscosity 70% solids slurry may then be shipped in bulk to a customer. The presence of a flocculant in the slurry often works against the desired effect of the dispersant, typically a low molecular weight polyacrylic acid, to disperse the solids and lower the viscosity. The necessary low viscosity for the final product is then not achieved, and a solids content higher than 60% is difficult to obtain.

An object of the filtering process is to produce a compact filter cake containing as little water as possible, while permitting the water to be removed from the cake as quickly as possible. In addition, it is desirable to minimize the amount of solids carried off with the water, since those solids are lost product. Therefore, a filter aid desirably binds the clay solids into flocs which are easily dewatered with minimal loss of solids and maximum solids content in the filter cake. As discussed above, after filtering, at least a portion of the filter cake may be redispersed into slurry form, usually by the use of a dispersant, and spray dried. The spray dried product, which may be combined with a portion of the filter cake, is then redispersed to produce a low viscosity 70% slurry which can be shipped in this form to customers. Because filter aids are flocculants, they may interfere with the dispersal of solids after filtering. It is therefore important that the filter aid not interfere with the redispersal of the clay slurry downstream of the filtering process.

Sharpe, U.S. Pat. Nos. 4,647,382, 4,741,838, 4,990,262 and 4,990,263 all relate to the use of various organic polymeric flocculants as filter aids for kaolinitic clays. U.S. Pat. No. 4,647,382 relates to the use of a polymer comprising 50–99 mole percent repeating units derived from acrylamide and 1–50 mole percent of repeating units derived form 2-acrylamido-2-methyl propyl sulfonic acid, or salts thereof. U.S. Pat. No. 4,741,838 relates to the use of an anionic polymeric flocculant comprising 1–100 mole percent of repeating units derived from 2-acrylamido-2-methyl propyl sulfonic acid, or a salt thereof, and may also include 75–99 mole percent repeating units of acrylamide, and up to 10 mole percent of a copolymerizable monoethylenically unsaturated monomer, such as acrylic acid. The flocculants used in both of these patents are anionic polymers. U.S. Pat. Nos. 4,990,262 and 4,990,263 relate to the use of certain cationic polymers as flocculants for dewatering filter cakes. The U.S. Pat. No. 4,990,262 uses a condensation product of formaldehyde and dicyandiamide, while the U.S. Pat. No. 4,990,263 uses copolymer of melamine and formaldehyde.

So-called "selective flocculation" is a procedure that is widely used commercially to separate finely divided minerals and powders. In the case of clay, some procedures utilize anionic polymers to selectively flocculate the clay, leaving the impurities dispersed and amenable to subsequent separation. Commercial variants of selective flocculation employ weakly anionic polymers such as hydrolyzed polyacrylamide to selectively flocculate impurities in the clay, leaving the purified clay dispersed. See, for example, U.S. Pat. No. 3,837,482, Sheridan, U.S. Pat. Nos. 3,701,417 and 3,862,027, both Mercade, U.S. Pat. No. 3,371,988, Maynard, et al., and U.S. Pat. No. 4,604,369, Shi.

Polyacrylic acids are anionic polymers derived from acrylic acid monomer. At relatively low molecular weights of about 2,000 to 10,000, they are commonly used as deflocculating or dispersing agents for kaolin clays. In particular, low molecular weight polyacrylic acid is commonly used to redisperse a flocculated filter cake. High molecular weight polyacrylic acids (with molecular weights over 2,000,000), however, have just the opposite effect. They have been found to act as flocculants.

In commonly assigned Behl, et al., U.S. Pat. No. 5,535,890, incorporated herein by reference, a high molecular weight polyacrylic acid or a salt thereof, or a or polyacrylic acid copolymer, is used as a flocculating agent for, among other purposes, flocculating impurities, such as metal oxides, for removal from a kaolin slurry. In that process, the flocculation is conducted under very alkaline conditions, the pH being about 9–11, at which the polymer is found to selectively flocculate metal oxide impurities without flocculating the slurried kaolin clay.

SUMMARY OF INVENTION

The present invention is directed to a novel process for filtering kaolin clay slurries in the presence of a filter aid which increases the percent solids in the filter cake, decreases the product solids in the waste filtrate, increases the rate of filtration, and yet quite unexpectedly does not increase the Brookfield viscosity after the filter cake is redispersed.

The process of the present invention utilizes high molecular weight, highly anionic polyacrylic acid homopolymers or copolymers, or water soluble salts thereof, as filter aids for thickening and dewatering kaolin clay slurries, wherein the flocculated clay may be redispersed after the separation process by normal means, such as the addition of low molecular weight anionic polymers with mixing. The polymers of the present invention simultaneously provide increased throughput and increased solids content in the product stream of the dewatering operation. This combination of properties by itself is difficult to achieve, since one skilled in the art would expect that a flocculant which increases product cake solids would cause at least a small decrease in throughput. Further, the product cake produced by this process was found to be readily redispersible to a high solids low viscosity slurry.

A practical advantage of the present invention is that the solids content of the filter cake can be increased significantly without penalty to filter production rates, resulting in cost savings derived from a reduced evaporative load in subsequent drying steps. For example, by increasing filter cake solids by 5% (e.g., 55% to 60%) the evaporative drying load is reduced by 0.152 tons of water per ton of kaolin processed. In addition, at constant evaporation rate in the drying step, dryer production is increased by 22.7%. On a typical spray dryer with an evaporation capacity of 50,000 lbs water/hr, this could result an annual energy savings of over 22,835 MMBtu coupled with an additional 53,655 tons in annual dry product capacity.

A key to the present invention lies in the discovery that at normal acidic filtering conditions of a pH of about 3–5, the anionic polymers of the present invention are strong flocculants for clay and form a readily filterable filter cake. The flocculants bind strongly to the clay particles, and hold them together during the filtration. However, after filtration is complete, when the cake is raised to a pH of at least about 7, and agitated for redispersion, it was found that the high molecular weight anionic polymeric flocculants of the present invention no longer acted as flocculants for the clay. Thus, it was observed that under these conditions, the polymer does not interfere with the redispersal of the clay, allowing a relatively low viscosity clay slurry to be obtained.

DESCRIPTION OF PREFERRED EMBODIMENTS

The flocculating agent used in the process of the present invention is highly anionic and is a homopolymer or co-polymer of a carboxylic acid, carboxylic anhydride or carboxylic acid salt monomer with a suitable non-ionic monomer. Examples of non-ionic monomers are carboxylic acid amide and carboxyl alkyl esters. A co-polymer of acrylic acid (or salt thereof) and acrylamide is preferred for kaolin processing. Since the polymer is highly anionic, it consists predominately of the acrylic acid group.

A flocculating agent used successfully in the process of the present invention is a highly anionic, high molecular weight copolymer of sodium acrylate and acrylamide having greater than 50% (by weight) acrylate and a molecular weight in excess of 2 million. To be considered "highly anionic", for purposes of the present invention, a polymer should contain at least 50% anionic units, such as acrylic acid monomer units. A preferred polymer has 80% or greater acrylate (by weight) in the co-polymer, more preferably at least about 95%, and includes a homopolymer of 100% acrylate. Good results were obtained using a polyacrylate homopolymer with a molecular weight greater than 2 million. For acrylate acrylamide copolymers, the molecular weight is preferably at least about 5 million.

Among the polymers suitable for use in the present invention are polyacrylate homopolymers and acrylate/acrylamide copolymers which may be obtained from Sharpe Specialty Chemical Co. and include Sharpfloc™ 9990, 9993, 9950 and 9954. The 9990 and 9993 polymers are both polyacrylic acid (PAA) homopolymers, with molecular weights of 20 million and 10 million respectively. The 9950 and 9954 polymers are copolymers of acrylic acid and acrylamide having about 95% anionic charge, and having molecular weights of about 20 million and 5 million respectively. The method of production of these polymers is proprietary. In theory they can be prepared by either co-polymerization of acrylamide and acrylic acid (anionic monomer) or by partial hydrolysis of polyacrylamide. Another polymer suitable for use in the present invention is a polyacrylate homopolymer with a molecular weight of about 2 million sold under the name AR-7H by ALCO Chemicals.

While the filter aid of the present invention may be added before or after bleaching of the clay slurry, it is preferred to be added after bleaching and/or flocculation and just before filtration. When added just before filtration, the amount of shear the filter aid is subjected to is minimized, thereby preventing damage to the filter aid's structure and well as minimizing any processing disadvantages due to increased viscosity.

EXAMPLES

The following examples are given to illustrate the invention in presently preferred best mode operation and are not to be construed as limiting the invention thereto. In Examples 1 to 5, the kaolin crudes employed were from a mine in Georgia, U.S.A. The typical particle size distribution was 80% (weight) finer than 2 microns with average particle size being 0.3 to 0.4 microns.

All quantities are reported on a dry weight basis unless otherwise indicated. All mesh sizes refer to values obtained using U.S. Sieves.

In the accompanying examples, slurries were prepared for measurement of Brookfield viscosity, using Engelhard Corporation procedure PL-1. Brookfield viscosity (in milliPascal-seconds (mPa.s)) was measured using TAPPI procedure T648 om-88 at 20 rpm, using the #2 spindle, unless otherwise noted. Hercules end point viscosity was measured using an "A" bob at 16 dynes, and is express in rpm. All slurries were formulated with optimum amount of dispersant, following Engelhard Corporation procedure PL-3. Descriptions of these Engelhard procedures appear in U.S. Pat. No. 4,738,726 and are incorporated herein by reference.

Example 1

A sample of a delaminated coarse hydrous clay having about 65–75% particles <2 μm and which had undergone sodium dithionite bleaching was obtained. Such bleach product is typically treated with 4 lb/ton of bleach and 4 lb/ton of alum and flocced with sulfuric acid to a pH of 3.0. (Please note: all dosages are in pounds per ton of dry clay, abbreviated lb/ton, unless otherwise specified. Also, the pH reported after acid treatment in this and all other examples represent an initial pH that will vary according to the amount and type of filter aid added). This sample represents the Control. Advantages of this invention are showed by adding to the Control the various filter aids of the present invention just before filtration. Two sets of experiments were performed using AR-7H™ polymer.

In the first set, the effect of polymer treatment was tested. Also, tested was the effect of shearing the slurry under high shear. This was performed to simulate operations such as pumping. The second set of experiments were performed to ascertain the effect of aging the polymer treated slurry.

Tables 1 and 2 show the results of these tests. It can be seen that the rate of filtration increases by more than 30% with polymer treatment at 2 lb/ton. It should be noted that no negative impact was observed on the filter cake solids. Rheological data after the filter cake was redispersed to a slurry of 67% solids showed an unexpected improvement in the clay water Brookfield and Hercules viscosity (both high shear and low shear). The lower Brookfield viscosity is desirable in improving the handleability of the clay slurry while the higher Hercules viscosity shows an improved resistant to shear compared to the Control. Further, it can also be seen that subjecting the slurry to high shear rates and aging negatively impacts the filtration rate. However, a comparable effect would be expected had the Control undergone a similar high shear rate and aging.

TABLE 1

Effect of AR-7H ™ Polymer on Filtration Rate, and Effect of Higher Shear Treatment

| PROPERTY | CONTROL | Treated with AR-7H Polymer @ 2 lb/ton | |
|---|---|---|---|
| | | As-Is | After Shear |
| Cake, % Solids | 57.5 | 57.6 | 56.7 |
| Cake, rate lb/ft$^2$-hr | 7.28 | 9.89 | 7.28 |
| Filtrate, % solids | 0.28 | 0.42 | 0.37 |
| Filtrate, solids lb/ft$^2$-hr | 0.048 | 0.080 | 0.067 |
| VISCOSITY @ 67% solids | | | |
| Brookfield @ 20 rpm, No. 2 spindle(mPa · s) | 220 | 195 | — |
| Hercules Viscosity @ 16 dynes, A bob (rpm) | 175 | 250 | — |

TABLE 2

Effect of AR-7H ™ Polymer on Filtration Rate, and Effect of Aging Polymer Treated Slurry

| PROPERTY | CONTROL | Treated with AR-7H Polymer @ 2 lb/ton | |
|---|---|---|---|
| | | As-Is | Aged 24 hrs |
| Cake, % Solids | 58.6 | 58.4 | 58.5 |
| Cake, rate lb/ft$^2$-hr | 7.08 | 9.96 | 7.88 |
| Filtrate, % solids | 0.3 | 0.39 | 0.40 |
| Filtrate, solids lb/ft$^2$-hr | 0.051 | 0.080 | 0.073 |
| VISCOSITY @ 67% solids | | | |
| Brookfield @ 20 rpm, No. 2 spindle(mPa · s) | 260 | 175 | — |
| Hercules Viscosity @ 16 dynes, A bob (rpm) | 325 | 350 | — |

Example 2

Filter leaf tests were performed on another Control sample of a delaminated hydrous clay bleach product, having about 88–92% particles <2 µm and a pH of about 2.7. Tests were performed for two polymers at two dosage levels. Results in Table 3 show that on treating the slurry with AR-7H™ polymer there was a significant increase in the filtration rate as compared to the control. There was also a slight increase in the filter cake solids. Further, there was a significant decrease in the filtrate losses with polymer treatment, as shown by the percent solids in the filtrate.

The results also show that although the treatment with Sharpfloc™ 9950 polymer only marginally improved the filtration rate, there was a significant increase in the cake solids from 51% to about 60%. Such an increase in cake solids generally increases the commercial value of the product.

TABLE 3

Effect of Different Polymers on Filtration Rate of Clay

| PROPERTY | CONTROL | Treated with | | | |
|---|---|---|---|---|---|
| | | 2 lb/ton AR-7H | 3 lb/ton AR-7H | 0.5 lb/ton Sharpfloc 9950 | 1.5 lb/ton Sharpfloc 9950 |
| Cake, % Solids | 51.7 | 53.2 | 53.3 | 60.2 | 60.6 |
| Cake, rate lb/ft$^2$-hr | 7.8 | 11.3 | 13.2 | 8.1 | 8.0 |
| Filtrate, % solids | 7.1 | 1.33 | 1.53 | 0.69 | 0.70 |
| Filtrate, solids lb/ft$^2$-hr | 1.7 | 0.44 | 0.55 | 0.24 | 0.24 |

Example 3

Filter leaf tests were performed on two Control float grade clays, which had undergone flotation with tall oil and a limestone carrier to remove $TiO_2$ and having approximately a 2.5–3.0 pH. Because of the flotation process, these slurries contained excess calcium ions from the limestone. The tests were conducted using AR-7H™ and Sharpfloc™ 9950 polymers respectively. Results in Table 4 and Table 5 show that there was a moderate effect of the polymer treatment on the filtration rate or the filter cake solids. Also, no effect on the rheological properties was observed. It is believed that the presence of the calcium ions in these slurries inhibited the flocculating effect of the polymers.

TABLE 4

Effect of AR-7H ™ Polymer on Filtration Rate of a Floated Clay

| PROPERTY | CONTROL | Treated with | |
|---|---|---|---|
| | | 2 lb/ton AR-7H | 3 lb/ton AR-7H |
| Cake, % Solids | 59.7 | 59.7 | 58.2 |
| Cake, rate lb/ft$^2$-hr | 5.01 | 5.15 | 5.37 |
| Filtrate, % solids | 0.54 | 0.67 | 0.50 |
| Filtrate, solids lb/ft$^2$-hr | 0.09 | 0.098 | 0.09 |

TABLE 5

Effect of Sharpfloc ™ 9950 Polymer on Filtration Rate of a Floated Clay

| PROPERTY | CONTROL | Treated with 1 lb/ton Sharpfloc 9950 | 2 lb/ton Sharpfloc 9950 |
|---|---|---|---|
| Cake, % Solids | 59.1 | 58.2 | 57.6 |
| Cake, rate lb/ft$^2$-hr | 4.62 | 5.21 | 5.43 |
| Filtrate, % solids | 0.90 | 0.27 | 0.21 |
| Filtrate, solids lb/ft$^2$-hr | 0.145 | 0.040 | 0.032 |

Example 4

The Control clay slurry of Example 1 was treated at different dosages of AR-7H™ polymer. Results in Table 6 show that on increasing the polymer dosage the Brookfield viscosity first decreases and then increases while the Hercules viscosity improves considerably. A treatment dosage level of about 3 lb/ton seemed optimal for this clay, based on viscosity. In this manner, preferred dosage levels can readily be determined for other clay slurries.

TABLE 6

Effect of Dosage of AR-7H ™ Polymer on the Viscosity of a 67% Clay Slurry

| Dosage (lb/ton) | Brookfield Viscosity @ 20 rpm, No. 2 Spindle (mPa · s) | Hercules Viscosity, @ 16 dynes, A bob (rpm) |
|---|---|---|
| 0 | 220 | 175 |
| 1.0 | 200 | 180 |
| 2.0 | 195 | 250 |
| 3.0 | 185 | 280 |
| 5.0 | 250 | 485 |

From the above, it can be seen that high molecular weight, in excess of 2 million, polyacrylic acid or its salt can effectively be used as a viscosity and filter aid for non-floated clays. The process of the present invention has been demonstrated to improve the filtration rates of clays without impacting the solids in the cake and the viscosity. However, polyacrylic acid is known to complex with divalent cations, and therefore clay streams with an excess of divalent ions, such as floated clays which have calcium, do not seem to respond as well to this treatment.

What is claimed is:

1. In a process for dewatering an aqueous slurry of kaolin clay by filtration to produce a filter cake and a filtrate, followed by washing the filter cake and addition of a low molecular polyacrylate dispersant to fluidize the washed filter cake at a neutral or alkaline pH, the improvement which comprises carrying out said filtration at a pH in the range of 3 to 5 with a polyacrylate filter aid comprising a polyacrylic acid homopolymer or a polyacrylic acid copolymer of sodium acrylate and acrylamide having greater than 50% by weight acrylate, or a water soluble salt of the homopolymer or copolymer, and wherein said homopolymer or copolymer is highly anionic and has a molecular weight in excess of 2 million, wherein said filter aid binds kaolin clay solids in said aqueous slurry into flocs, to decrease the amount of kaolin clay solids in said filtrate, and increase the amount of kaolin clay solids in said filter cake.

2. The process of claim 1 wherein the filter aid is a copolymer of sodium acrylate and acrylamide having greater than 80% by weight acrylate, or a water soluble salt thereof.

3. The process of claim 2 wherein the copolymer has greater than 95% by weight acrylate.

4. The process of claim 3 wherein the molecular weight of the copolymer is in excess of 5 million.

5. The process of claim 2 wherein the molecular weight of the copolymer is in excess of 5 million.

6. The process of claim 1 wherein the molecular weight of said homopolymer or copolymer is in excess of 5 million.

\* \* \* \* \*